3,754,007
PROCESS FOR THE PRODUCTION OF CYCLO-
HEXANEDIONE-(1,2)-HEMIHYDRATE
Wilhelm Sutter, Leverkusen, Karl-Friedrich Wedemeyer,
Cologne, Germany, assignors to Bayer Aktiengesell-
schaft, Leverkusen, Germany
No Drawing. Filed Feb. 6, 1970, Ser. No. 9,437
Claims priority, application Germany, Feb. 21, 1969,
P 19 08 679.4
Int. Cl. C07d 1/02, 13/00
U.S. Cl. 260—340.5
8 Claims

ABSTRACT OF THE DISCLOSURE

Cyclohexanedione-(1,2)-hemihydrate is obtained by introducing cyclohexanol, optionally containing water, and nitric acid simultaneously into aqueous sulphuric acid containing a catalytic amount of nitrous acid with thorough mixing at a temperature of 0° to 18° C.

---

The present invention relates to a process for the production of cyclohexanedione-(1,2)-hemihydrate.

It is known that the oxidation of cyclohexanol with dilute nitric acid at temperatures of around 90° C. leads to adipic acid. This reaction has for a long time been used in industry for the manufacture of adipic acid. It is also known that the oxidation takes a different course at temperatures up to about 20° C. and at higher nitric acid concentrations. A compound which is interpreted by most authors as a tetracyclic hemihydrate of cyclohexanedione-(1,2) is produced in moderate yields (J. Am. Chem. Soc. 78 (1956) page 1463). M. Anteunis and M. Verzele (see Bull. Soc. Chim. Belg. 73 (1964) pages 73–80), in their work on the manufacture of cyclohexanedione-(1,2) use the above mentioned literature references and give instructions for the production of the hemihydrate of cyclohexanedione, which they call "predione."

They state that their compound is identical with that described in J. Am. Chem. Soc. (see above) but interpret it as cyclohexane-(1,2)-dihydroxy-epoxide-(1,2).

If their instructions are followed it is necessary to employ extreme care, especially if 57% strength nitric acid is used because of the somewhat higher yield. Even if, as indicated, the process is carried out with small quantities, the reaction can, given inadequate cooling, easily get out of control because of its strongly exothermic character and take place explosively. When the reaction takes place normally in accordance with the instructions, the hemihydrate is obtained mixed with considerable amounts of ω-nitro-ω-oximinohexanecarboxylic acid of formula

HOOC—(CH$_2$)$_4$—(C=NOH).NO$_2$ ("nitrolic acid")

This compound tends to undergo a strongly exothermic explosion-like decomposition, which is why it is removed by eluting with large amounts of diethyl ether. The known process therefore, is not suitable for economical manufacture and above all for manufacture which is safe against accidents, as also emerges from the following comments in the publication:

"By working in this way the tendency of the reaction to get out of control and to become nearly explosively exothermic is also increased and the necessary care and precautions are to be taken."

The hitherto otbainable yield of at most 45% is achieved by means of reaction conditions in which the reaction easily becomes uncontrollable and can take an explosive course, so that manufacture on a larger scale is impossible.

Since the product hitherto obtainable according to the above-mentioned process proves on titration with hydroxylamine hydrochloride at 80° C. using sodium hydroxide solution—as is the usual procedure in the determination of ketones—only to contain about 80–90% of hemihydrate, the data on yield given above (40–45% of theory) have to be correspondingly scaled down.

It has now been found that cyclohexanedione-(1,2)-hemihydrate can be manufactured with less danger and in good yields, even on a larger scale.

The present invention provides a process for the production of cyclohexanedione-(1,2) hemihydrate which comprises introducing cyclohexanol, optionally containing water, and nitric acid simultaneously into aqueous sulphuric acid containing a catalytic amount of nitrous acid with thorough mixing at a temperature of 0° to 18° C.

Generally, the crude cyclohexanedione-(1,2) which separates, or which is caused to separate, is isolated and washed with water.

If the cyclohexanol contains water, it is preferred to use cyclohexanol saturated with water, corresponding to a water content of about 10% by weight at room temperature. Of course it is also possible to use smaller amounts of water, provided it is made sure that these, where appropriate together with the water present in the reaction medium (acid), suffice to prevent solidification of the cyclohexanol (melting point 24.5° C.) in the initially introduced sulphuric acid in the temperature range of 0–18° C.

In general, about 1–2 mols of nitric acid are used per mol of cyclohexanol optionally containing water, and it can, under certain circumstances, be appropriate initially to introduce up to 0.5% of the nitric acid employed together with the sulphuric acid. The nitric acid employed should have a concentration of about 60–100% by weight, and a 98% strength nitric acid is preferred.

The amount of the aqueous sulphuric acid employed (at least 30% strength by weight, preferably 40–50% strength by weight, the remainder being water) depends on the desired consistency of the reaction mixture produced. The amount of sulphuric acid is less critical since it simultaneously plays the role of the diluent but should be such as to ensure that the reaction components can be thoroughly mixed.

In general it has proved appropriate to employ about 200–300 g. of sulphuric acid containing water per mol of cyclohexanol.

It is important for the safe conduct of the process to avoid enrichment of the reagents in the foam which may form under certain circumstances, and this can be achieved by introducing the reactants below the surface.

It is important for the smooth start of the reaction that the reaction mixture should contain at least catalytic amounts of nitrous acid. It will sometimes suffice to employ nitric acid which is coloured brown by nitrous gases, or to introduce nitrous gases or nitrosylsulphuric acid (0.1–1 g., preferably 0.05–0.2 g. per mol cyclohexanol) into the nitric acid employed.

In order to be on the safe side, it is however advisable to add to the reaction mixture about 200 mg. of alkali nitrite, preferably sodium nitrite, per mol of cyclohexanol.

A further increase in the yield can be achieved if the reaction is carried out in the presence of catalytic amounts of a heavy metal salt (for example a sulphate or, preferably, a nitrate, of copper, gold or lead, or preferably, silver). Here amounts of about 0.1–1.0 g. of salt, for example AgNO$_3$, per mol of cyclohexanol are used.

The reaction is carried out in the temperature range of 0–18° C., preferably about 5–15° C., (especially at about 10° C.), it being necessary to ensure intensive mixing of the reaction mixture. The course of the reaction can optionally also be followed by measuring the amounts of gas issuing, about 18–22 litres of gas (main constituent N$_2$O) being evolved per mol of cyclohexanol after saturation of the reaction mixture.

The mixtures may be worked up in the temperature range specified for carrying out the reaction, preferably at about 10–15° C., by suction filtration; any small amounts of nitrolic acid formed at the same time which may remain in the filter cake can be removed in a simple manner by eluting with warm water (water temperature preferably about 50–60° C.).

The process according to the invention is distinguished in that the content of nitrolic acid in the mother liquor may be extremely low, for example only about 0.03–0.04 mol per mol of cyclohexanol. For this reason the mother liquors produced are stable and can be exposed to temperatures up to about 90° C. without decomposing exothermically.

The mother liquor produced can also be directly re-used for new reaction mixtures.

The process according to the invention can be carried out both continuously and batchwise.

The cyclohexanedione-(1,2)-hemihydrate obtained is an intermediate for the production of plant protection agents.

The process of the present invention is illustrated by the following examples.

EXAMPLE 1

290 g. of 50% strength by weight aqueous sulphuric acid are initially introduced into a four-necked flask with two dropping funnels, an internal thermometer, a stirrer and a gas outlet tube fitted with a gas meter, and are cooled to +5 to +10° C. and mixed with 0.5 g. of sodium nitrite. 129 g. of 98% strength by weight nitric acid and 140.4 cm.$^3$ of 90% strength by weight cyclohexanol (the remainder being water) are added dropwise under the surface of the initially introduced sulphuric acid solution, whilst cooling externally with ice water.

Depending on the effectiveness of the external cooling, 3–4 hours are required for this. Appropriately, about 5 cm.$^3$ of nitric acid are initially introduced. The amount of the issuing gas evolved should be about 0.5 litre in the first quarter-hour and from then onwards about 1 litre in 10–15 minutes. When both reagents have been introduced, the mixture is stirred for a further ½ hour at 15° C. as a precaution. The end of the reaction can be detected through the gas evolution subsiding. Working up is carried out by filtering off, eluting with water (about 50° C.) and drying.

Moist weight of the washed filter cake _____g__ 129.2
Content of cyclohexanedione-(1,2)-hemihydrate according to the ketone titration _____percent__ 62.15
Yield of cyclohexanedione - (1,2) - hemihydrate (pure) _____percent__ 62.0

EXAMPLE 2

If the process is carried out in the presence of 0.6 g. of silver nitrate which is dissolved in the initially introduced sulphuric acid before starting the reaction, the following result is obtained:

Moist weight of the washer filter cake _____g__ 147.7
Content of cyclohexanedione-(1,2)-hemihydrate according to the ketone titration _____percent__ 62.15
Yield of cyclohexanedione - (1,2) - hemihydrate (pure) _____percent__ 63.2

EXAMPLE 3

If, according to the process of Example 1, 242 g. of 60% strength by weight sulphuric acid are initially introduced and 182 g. of 72.0% strength by weight nitric acid are added dropwise simultaneously with the cyclohexanol, the following results are obtained:

Moist weight of the filter cake _____g__ 145.5
Content of cyclohexanedione - (1,2) - hemihydrate _____percent__ 61.85
Yield of cyclohexanedione - (1,2) - hemihydrate (pure) _____ 62.0

What we claim is:
1. A process for the production of cyclohexanedione-(1,2)-hemihydrate which comprises introducing cyclohexanol and nitric acid in a concentration of 60 to 100% by weight simultaneously into aqueous sulfuric acid containing a catalytic amount of nitrous acid with thorough mixing at a temperature of 0° to 18° C.
2. A process according to claim 1 in which the cyclohexanol contains up to about 10% by weight of water.
3. A process according to claim 1 in which the cyclohexanedione-(1,2)-hemihydrate separating out from the reaction mixture is isolated then washed with water.
4. A process according to claim 1 in which the nitric acid is added in an amount of 1 to 2 moles per mole of cyclohexanol or water-cyclohexanol mixture.
5. A process according to claim 1 in which the aqueous sulphuric acid has a concentration of 40 to 50% by weight.
6. A process according to claim 1 in which the cyclohexanol and nitric acid are passed into the aqueous sulphuric acid below the surface thereof.
7. A process according to claim 1 in which 200 mg. of alkali metal nitrile per mole of cyclohexanol are added to the reaction medium.
8. A process according to claim 1 wherein the reaction is carried out in the presence of a heavy metal salt catalyst selected from the group of the sulphates and nitrates of copper, gold, lead and silver, said catalyst being present in amounts of about 0.1 to 1.0 grams per mol of cyclohexanol.

References Cited

De Borger et al.: "Bull. Chem. Soc. Belg." vol. 73, pp. 73–80, 1964.

Godt et al.: "Jour. Am. Chem. Soc." vol. 78, pp. 1461–1464, 1956.

BERNARD HELFIN, Primary Examiner

N. MORGENSTERN, Assistant Examiner

U.S. Cl. X.R.

260—348 C, 531 R, 586 R